United States Patent
Chiu et al.

(10) Patent No.: US 6,654,029 B1
(45) Date of Patent: Nov. 25, 2003

(54) DATA-BASE INDEPENDENT, SCALABLE, OBJECT-ORIENTED ARCHITECTURE AND API FOR MANAGING DIGITAL MULTIMEDIA ASSETS

(75) Inventors: Sheng-Yang Chiu, Palo Alto, CA (US); Sathis N. Menon, Sunnyvale, CA (US); Jeffrey D. Hollar, Livermore, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/579,461

(22) Filed: May 26, 2000

Related U.S. Application Data

(62) Division of application No. 08/644,686, filed on May 31, 1996, now Pat. No. 6,181,336.

(51) Int. Cl.[7] ............................................. G06T 17/00
(52) U.S. Cl. .................................................... 345/717
(58) Field of Search ................................ 345/717, 733, 345/751, 965, 967, 968

(56) References Cited

U.S. PATENT DOCUMENTS 5,091,849 A * 2/1992 Davis et al. ................ 395/100

OTHER PUBLICATIONS

Aronson "HTML3 Manual of Style," 1995, pp. 112–113.
Colton, M., "Multimedia Asset Management White Paper," *About Informix White Papers*, Informix, actual publication date unknown, estimated 1992–1993.

* cited by examiner

Primary Examiner—Almis R. Jankus
(74) Attorney, Agent, or Firm—Sterne, Kessler, Goldstein & Fox PLLC

(57) ABSTRACT

A system is described for providing an integrated, efficient and consistent production environment for the shared development of multimedia productions. Examples of multimedia productions include feature animation films, computerized animation films, interactive video games, interactive movies, and other types of entertainment and/or educational multimedia works. The development of such multimedia products typically involve heterogeneous and diverse forms of multimedia data. Further, the production tools and equipment that are used to create and edit such diverse multimedia data are in and of themselves diverse and often incompatible with each other. The incompatibility between such development tools can be seen in terms of their methods of operation, operating environments, and the types and/or formats of data on which they operate upon. Disclosed herein, is a complete solution that provides a consistent and integrated multimedia production environment in the form of common utilities, methods and services. The common utilities, methods and services disclosed herein, are used to integrate the diverse world of multimedia productions. By using the common utilities, methods and services provided, diverse multimedia production tools can access, store, and share data in a multiple user production environment in a consistent, safe, efficient and predictable fashion.

5 Claims, 9 Drawing Sheets

DATA-BASE INDEPENDENT, SCALABLE, OBJECT-ORIENTED ARCHITECTURE AND API FOR MANAGING DIGITAL MULTIMEDIA ASSETS

This is a division of application Ser. No. 08/644,686 filed on May 31, 1996, now U.S. Pat. No. 6,181,336.

COMPUTER PROGRAM LISTING APPENDIX

A computer program listing appendix containing the source code of a computer program that may be used with the present invention is incorporated herein by reference and appended hereto as one (1) original compact disk, and an identical copy thereof, containing a total of sixteen (16) files as follows: ACL.H; AMGR.H; BASE.H; BASEMGR.H; BUFFER.H; DATAMOD.H; DATETIME.H; ENCODE.H; ENV.H; EXCEPT.H; OID.H; REPLICA.H; REPO.H; STRING.H; TYPES.H; AND VALUE.H.

BACKGROUND OF THE INVENTION

1. Field of the Invention

The present invention relates generally to management and processing of multimedia works and more particularly to providing a uniform and consistent environment for the orderly development and archival of diverse multimedia works.

2. Related Art

The authoring of multimedia works can be a very expensive, time consuming and complicated process. Such projects can involve huge production teams, enormous budgets, and the resources of entire production studios for significant amounts of time. Such multimedia works not only include computerized feature films such as those produced by major Hollywood studios and the like, but they can also include interactive movies, video games and other entertainment and educational type content that can run on personal computers, dedicated game consoles, kiosk machines and the like. It is becoming more common that the production of such multimedia titles consume monetary budgets and other resources not unlike those commonly associated with major Hollywood feature film productions.

Multimedia data, such as collections of digital animations come in a variety of heterogeneous formats and structures. Typically, during the creation of a multimedia project, many different tools and application programs are used to create, edit, and otherwise process various types of multimedia data. In general each of the application programs, such as multimedia content authoring tools, operate on particular types and/or formats of data. Such types and formats of data are typically not compatible with all the various application programs used in the production process.

Additionally, each tool generally requires its own unique file structures, hierarchies, and naming conventions, etc., to manage, store and retrieve data. Each tool may also use different methods to catalog, search, and preview data. Likewise, each tool may use a different method (or no method at all), to track different versions of multimedia data. In addition, many tools operate on different computer platforms and environments that are not compatible with each other. In a typical shared development process, such inconsistencies make it difficult to coordinate and share resources among various members of the development team. In addition, such inconsistencies make it difficult to catalog and archive data in an efficient, safe, and consistent manner. Problems arising from such inconsistencies can be very costly.

SUMMARY OF THE INVENTION

The present invention is directed toward a system and method for providing a consistent and efficient production environment for the development of various types of multimedia works and for the orderly archiving of the multimedia works to facilitate their re-use in later projects. Examples of multimedia works can include feature animation films, computer animation films, video games, interactive movies, new clips, educational multimedia products, corporate multimedia productions, multimedia sales catalogs and the like. The present invention assists artists, computer programmers, production managers, editors, directors, and producers in tracking and managing all multimedia data created and used during the process of multimedia productions and in finding and re-using assets from previous productions.

Multimedia data, as the term is used herein, includes any and all types of data used to produce any and all types of multimedia works. Each instance of multimedia data need not comprise multiple data components or different types of media. Indeed multimedia data can comprise data of a single media type. For example, a JPEG data file is an industry standard for a compressed data format that comprises a single still video image. Even though a JPEG file comprises a single media type, it is considered to be multimedia data because it can be used as part of a multimedia production. Likewise, a multimedia authoring tool that can be used to create JPEG files may be referred to herein as a multimedia tool. Multimedia data can also comprise multiple types of media. For example, an MPEG data file is an industry standard for a compressed data format that comprises full-motion video as well as audio data components. Thus, an MPEG data file is another example of multimedia data.

The present invention provides an integrated platform for a variety of diverse computerized utilities and application programs that operate on and/or create various types of multimedia data. Such computerized utilities and application programs can include video film editors, painting programs, three-dimensional modeling utilities, animation tools, and other multimedia data tools, running on a variety of computer systems and platforms.

The present invention provides a means for bringing compatibility and uniformity to diverse multimedia production environments. As stated, a multimedia production environment typically comprises a plurality of diverse types of production tools. The present invention accomplishes compatibility and uniformity among such diverse multimedia production tools by providing them with common program resources. The common program resources include a plurality of utilities and services related to the management, organization and storage of multimedia data. Such program resources are used to facilitate the creation of a consistent and uniform multimedia production environment.

The program resources provided by the present invention also include a plurality of user interface components. Such user interface components provided by the present invention can include dialog boxes, scrollable list boxes, data entry tables, data browsing facilities and the like. By using a common set of user interface components, diverse multimedia production tools can achieve a common overall look and feel and thereby create a more consistent and uniform production environment from the user's perspective.

Also provided is a means for modifying and/or adding extensions to the plurality of utilities and services provided by the present invention. This feature allows production studios to quickly adapt to the rapidly changing environment of multimedia data and multimedia production tools.

Further, the present invention provides services and utilities for indexing, storing, retrieving, searching, and generally managing and manipulating all of the multimedia data created or used during the production process. The present invention provides for implementation of these features through the use of one or more data base management systems (DBMSs). Typically, DBMSs that are supported by the present invention are of the commercial-off-the self variety. This feature facilitates the use of presently existing and/or readily available DBMSs. However, support for additional DBMSs can easily be added. Likewise, the services and utilities provided by the present invention, which interact with the supported DBMSs, can easily be modified and/or extended. Thus, a production studio simply attaches, in a 'plug-and-play' (PNP) fashion, one or more supported DBMS(s), and the file management features of the present invention are automatically implemented.

All multimedia data created and used during the production process are organized by the present invention into data objects that are referred to herein as 'assets'. An asset is a data object that is defined by the present invention in a particular manner. Each asset comprises two components, namely, a contents component and a metadata component. The metadata component comprises information about an asset, such as its storage location, creation date, creator(s), etc. The contents component comprises the actual multimedia data, which is typically a digital representation of, for example, a visual and/or audio data object. For example, an asset representing a JPEG type image file as described above, comprises a metadata component and a contents component. The contents component is the JPEG file itself, which is a digital representation of a still video image. The creator's name, the date of creation, and the fact that the file is a 240×320 JPEG image are examples of the types of information comprising the metadata component of an asset.

All multimedia data is managed by the present invention in the form of assets. Assets are logically stored by the present invention in a location that is referred to herein as the 'asset bank' or 'Vault'. As stated, the actual implementation of the asset bank or Vault is via one or more supported DBMS(s) and associated file systems.

In addition, the present invention provides a means for managing and controlling separate and distinct versions of assets that are developed during the production process. Further, a means for logically relating versions of different assets to each other is provided. Accordingly, any asset version stored in the Vault can refer to any other asset versions stored in the Vault that is in some way related.

The contents component of asset data objects include for example, scanned-in line drawings, drawings that are inked and painted, backgrounds, inspirational artwork, color models, 3D models, x-sheets, and production spreadsheets. In addition, complex assets can be defined which comprise a combination of assets. For example, a sequence asset can comprise a combination of assets each comprising a single frame. In addition, the present invention can also be used to track non-digital assets such as film, analog and/or 'off-line' recordings, as well as paper drawings and the like. In this case, the metadata component of the non-digital data asset typically discloses, among other things, the actual physical location of the non-digital contents component of the asset data object.

Assets are defined and represented through an application programming interface (API), which is used as a uniform layer on top of the DBMS(s) and file system(s) which are typical implementations of the asset bank of the present invention. The API is implemented with a standard object-oriented class library (OOCL). Multimedia production tools can use the utilities provided by the OOCL to convert their multimedia data to assets of the type and format required by the Vault according to the present invention. Likewise, multimedia production tools can use the utilities provided by the OOCL to convert data assets retrieved from the Vault into multimedia data types and formats required by the multimedia production tool.

Assets are implemented using a technique referred to herein as 'data modeling'. Data modeling provides the support for the inquiry of assets during runtime. For example, at runtime, a multimedia production tool can determine information pertaining to any asset in the Vault. This enables the generation of a class of tools that can be used to work with all types of assets, including those that may be newly defined during the production process. For example, a generic browser can be implemented to convey detailed information about assets of any type, by using the run-time inquiry feature provided by an implementation of the present invention.

In addition, the present invention provides utilities which support the construction of common services which can include without limitation: checkin/checkout; asset version control; asset searches (including relational and indexed); access permissions to assets; support for Constant Frame Rate ('CFR') for movie and video playback; and support for work flow management.

In particular, the present invention consists of a Vault for the permanent storage of assets. In addition, a class library (API) is provided as an interface between multimedia production tools and the Vault. The collection of assets, and services provided by the class library are all extensible over time during entertainment product authoring, without re-implementing existing assets.

Note that in the instant disclosure, many of the examples contained herein, refer to the production of a feature animation film. However, it should be appreciated that the descriptions and examples are used herein to particularly point out the principals of the present invention, and such examples should not be construed to limit the scope of the present invention. As stated the present invention applies to all types of multimedia works.

Features and Advantages

General

A feature of the present invention is that it provides support so that a diverse variety of multimedia development tools which operate on a diverse variety of multimedia data can be integrated into an efficient, consistent and uniform environment for the production of multimedia works.

Another feature of the present invention is that it provides support for consistent and orderly cataloging and archiving.

An advantage of the present invention is that the cataloging and archiving features, facilitates reusing multimedia among diverse projects thereby reducing and/or eliminating costly and time-consuming authoring processes.

Another feature of the present invention is that it can be used with commercial off-the-shelf database management systems for the storage, retrieval, indexing and general management of multimedia data.

Versioning

Another feature of the present invention is that it provides support for different versions of assets.

Another feature of the present invention is that is provides support for branch versioning of assets.

Hierarchical Storage Management

Another feature of the present invention is that it provides support for hierarchical storage of assets.

Relationships Among Assets

Another feature of the present invention is that it provides support for relationships between assets including asset derivation.

User Defined Types

Another feature of the present invention is that is provides support for user defined assets. Such user defined assets can be defined dynamically in a run-time environment.

Shared Development

Another feature of the present invention is that it provides support for access control and replication of assets.

Another feature of the present invention is that it provides checkout/checkin functions to facilitate control of multimedia assets during shared development processing.

Data Integrity and Availability

Another feature of the present invention is that it provides for the control over assets integrity by detecting lost of corrupted assets. Additionally, corrupted or lost assets can be corrected upon detection by restoring such assets from backup tapes or the like.

Another feature of the present invention is that it supports different user selectable levels of fault tolerance where each level specifies the importance of immediate access to specific assets.

Off-line Storage

Another feature of the present invention is that it provides support for automatic incremental backups and/or full backups into off-line storage.

An advantage of the present invention is that is provides support so that a user can search and browse off-line assets as easily as one can search and browse on-line assets. Additionally, a user can easily bring assets offline and/or on-line.

Interoperability

Another feature of the present invention is that it supports data translation.

An advantage of the present invention is that it is easy to import and export assets to and from the file system.

Distribution

Another feature of the present invention is that all functions provided are accessible from client stations over a computer network.

Another feature of the present invention is that it provides for the storage and retrieval of assets to and from multiple machines and multiple platforms.

An advantage of the present invention is that it supports a variety of client platforms.

Another feature of the present invention is that it provides an open architecture such that a variety of data base management systems (DBMSs) manufactured by a variety of vendors can be used.

Searching/Browsing

Another feature of the present invention is that it supports multiple indices for retrieval of data and assets.

Another feature of the present invention is that it supports keyword searching including a cataloging system for keyword definition and tagging.

An advantage of the present invention is that it provides support for consistent and user-friendly methods for expressing queries and browsing assets.

Another advantage of the present invention is that it provides support for automatic cataloging when assets are created.

Another feature of the present invention is that it provides support for thumbnails and previews for all appropriate assets. A preview is a method to view an asset in a lower-than-normal-resolution. The preview of a video clip, for example, may be the first and last frame plus user selectable intermediate frame(s) from the clip at a lower frame resolution.

Usability

An advantage of the present invention is that it is fast and it uses storage space efficiently.

Another feature of the present invention is that a user can launch an asset's application (if available) from the asset's thumbnail/icon.

Security

Another feature of the present invention is that it provides support for various levels of access control.

Extensibility

Another feature of the present invention is that its architecture is modular and extensible.

Application Integration

Another feature of the present invention is that it supports integration with production management, such as notification when changes have been made to assets.

Another feature of the present invention is that it does not require immediate modifications to existing applications that are to be used as clients (described below). Instead, the present invention provides a path for clients to become more tightly integrated with the present invention at selectable paces and timings as desired.

Constant Frame Rate Delivery

Another feature of the present invention is that is supports frame accurate playback of video and audio. This is used for viewing work-in-progress, for instance. The constant frame rate delivery feature works on a variety of client platforms and a variety of connectivity means.

BRIEF DESCRIPTION OF THE FIGURES

The present invention will be described with reference to the accompanying drawings, wherein.

Figure 1:
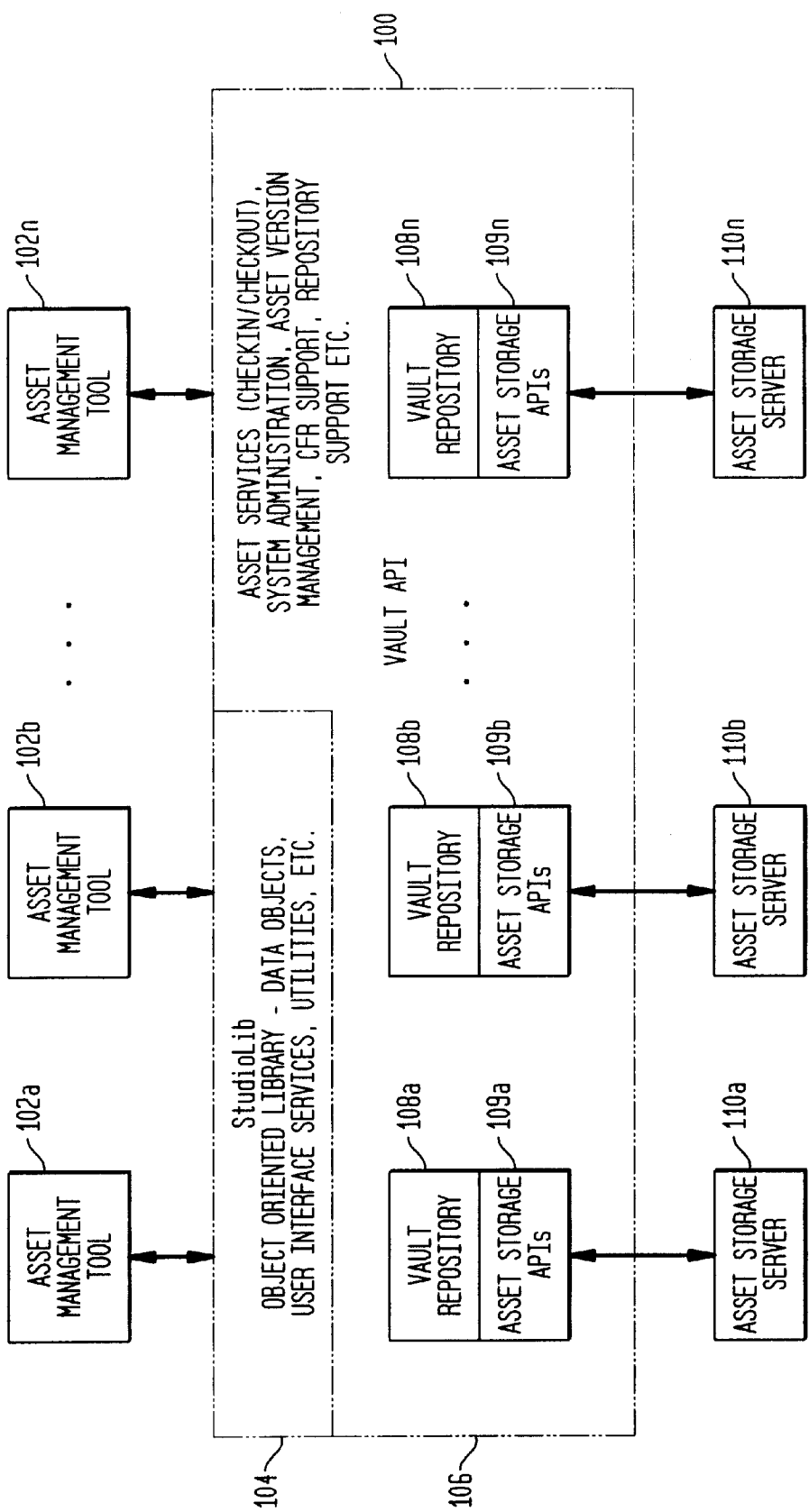
FIG. 1 is a block diagram depicting the structure and the architecture according to an embodiment of the present invention.

In addition, a program listing comprising the application programming interface, according to a preferred embodiment of the present invention is presented in the Appendix below.

In the drawings, like reference numbers generally indicate identical, functionally similar, and/or structurally similar elements. The drawing in which an element first appears is indicated by the leftmost digit(s) in the reference number.

DETAILED DESCRIPTION OF THE PREFERRED EMBODIMENTS

The present invention provides a means for bringing compatibility and uniformity to multimedia production environments by providing common programming tools to be used in a common environment by diverse multimedia production tools. The programming tools include a plurality of utilities and services related to the management, organization, and storage of multimedia data. In addition, such programming tools can include a plurality of user interface components to facilitate a common look and feel between the diverse multimedia production tools.

The present invention also provides services and utilities for indexing, storing, retrieving, searching, and generally managing and manipulating all of the multimedia data created or used during a multimedia production process. The present invention provides for implementation of these features through the use of one or more commercial off-the-shelf data base management systems (DBMSs). Thus, a production studio implementing an embodiment of the present invention simply attaches one or more of the supported DBMS(s), to implement the file management features of the present invention.

All multimedia data created and used during the production process are organized by the present invention into data objects that are referred to herein as assets. Each asset comprises two components, namely, a contents component and a metadata component. The metadata component comprises information about an asset, while the contents component comprises actual multimedia data, which is typically a digital representation of a visual and/or audio data object.

In order to distinctly point out the principles of the present invention, an example environment of an implementation of the present invention will be described herein. This example environment described herein is a shared multimedia development environment which is implemented by using the present invention. This development environment is referred to as the 'Asset Management System' or more simply, the 'AMS'.

Referring now to FIG. 1, the AMS development environment comprises the following. A plurality of 'asset management tools' 102a, 102b, . . . 102n (generally 102) (also referred to herein as 'AMS clients'). The asset management tools 102 interface with the present invention via the StudioLib 104 and/or the Vault API 106. Note that the StudioLib 104 and the Vault API 106 comprises the program resources provided by the present invention, which is collectively referred to herein as the program resources 100. Multimedia data objects are logically stored and represented by assets in one or more Vault repositories 108a, 108b, . . . 108n (generally 108). Assets are physically stored by one or more asset storage servers 110a, 110b, . . . 110n (generally 110). The asset storage servers 110 interface with each Vault repository 108 through the asset storage APIs 109a, 109b, . . . 109n (generally 109). As will be described below, each asset storage server 110 comprises at least one metadata server for the metadata components of assets, and at least one content server for the content component of assets.

The asset management tools 102 typically include a variety of content creation tools which editors, artists and the like uses to create and edit multimedia content data. Such tools can include for example, video film editors, painting programs, three-dimensional modeling utilities and animation tools. Asset management tools may be commercial off-the-self type tools or tools that are developed according to particular needs.

Asset management tools are referred to herein as being 'AMS aware'. A presently existing or newly created multimedia production tool can become an asset management tool 102 by integrating its program code with an embodiment of the present invention. The level of integration depends on the needs and/or desires of the tool developer. A tool that uses few of the services and utilities of the present invention is referred to as being less integrated or less AMS aware, than a tool that uses more of the available services and utilities provided by the present invention. Thus, tool developers can become increasingly integrated with the present invention at their own paces and timings.

Asset management tools 102 can also include stand-alone utilities that generally provide services that operate on the assets stored in the Vault repositories 108. The services provided by such stand-alone asset management tools 102 can include for example, checking in, checking out, browsing, navigating, tagging, cataloging and previewing such assets.

Stand-alone asset management tools 102 can also be developed to be used as an interface between non-AMS aware application programs and the asset management system of the present invention. For example, instead of modifying an existing content creation tool to become AMS aware, a stand-alone tool can be developed that is not only AMS aware, but is also aware of the multimedia data file management system used in the non-AMS aware program.

For example, suppose a developer of a complex video editing tool would like such tool to be integrated with the asset management facilities provided by the present invention without making any changes therein. Alternatively, suppose a tool developer other than the developer of the complex video editing tool would like to provide a utility program that allows the complex video editing tool to use the asset management facilities provided by the present invention. In either case, instead of modifying the code and rebuilding the complex video editing tool so that it is directly integrated with an embodiment of the present invention, a relatively small stand-alone AMS aware checkin/checkout tool can be developed. This stand-alone tool acts as an interface between the asset management system of the present invention and the multimedia file management system of the complex video editing tool. In this fashion, an existing unmodified content creation tool can be seemingly integrated into the production system environment of the present invention. Examples of this concept will be subsequently provided herein with reference to FIG. 2.

As stated, the present invention provides program resources 100. Such program resources 100 are typically embodied in various APIs, objects, library functions, and the like. The program resources 100 depicted in the example environment in FIG. 1 includes the StudioLib 104 and the Vault API 106. Asset management tools interact with assets via the services provided by the StudioLib 104 and/or the Vault API 106.

In addition to services such as user interface dialogs (described below), the StudioLib 104 provides a means to define assets which are stored and managed by the present invention. As stated, all multimedia data created and used during the production process are organized by the present invention into data objects that are referred to herein as assets. Each asset comprises two components, namely, a contents component and a metadata component. The metadata component comprises information about an asset, such as its storage location, creation date, creator, etc. The contents component comprises the actual multimedia data, which is typically a digital representation of a visual and/or audio data object.

Figure 10:
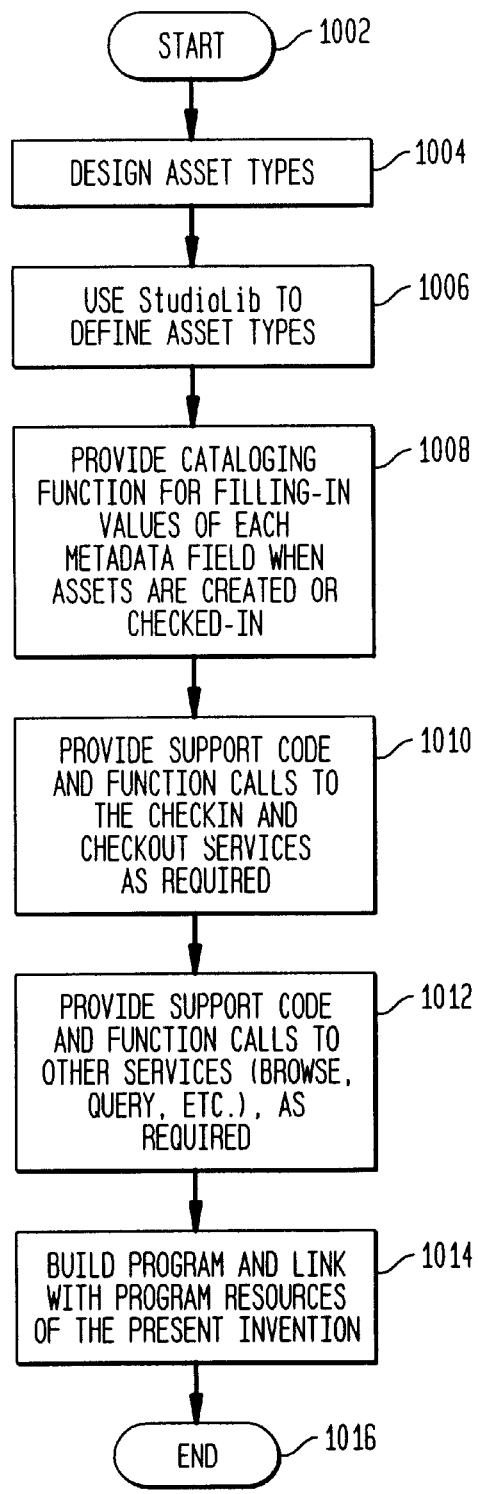
FIG. 10 is a flowchart depicting a process used to develop an asset management tool according to an embodiment of the present invention.

Referring now to FIG. 10, a process used by a tool developer to develop an asset management tool 102 (i.e. a tool that is AMS aware), is depicted. The process begins with step 1002 and immediately continues with step 1004. Step 1004, which is typically the first step in the design process, represents a key and fundamental design decision. In step 1004 the tool developer designs the composition and structure of each of the assets that may be created or otherwise used by the asset management tool 102.

Each tool can define one or more asset types. In making this decision, the tool developer decides what type of information is to be included for each instance of each asset type. In other words, the tool developer in step 1004, defines the set of attributes and the ranges of values permitted for such attributes, that comprise the metadata component for each asset type that is to be defined in step 1006.

Many common attributes such as object IDs, names of creators, dates, times, etc., are predefined for all asset types by the programming resources 100 of the present invention. In addition, other unique attributes not included in the predefined list of attributes, can be defined and selected via the programming resources 100 provided by the present invention.

In step 1006, classes of objects provided by the StudioLib object library 104 are used to construct the asset types designed in step 1004. As will be described below, these classes are subclasses of a predefined base class of object provided by the present invention. As part of the definition of an asset type, the name, attributes, and legal ranges of values for the attributes are registered with a object referred to herein as the 'Data Model Manager'. This information is used by the cataloging function in step 1008 to ensure that all necessary metadata about an asset are obtained and stored with the asset in the Vault.

Next in step 1008, programming code is supplied to provide for a cataloging function for each asset type defined in step 1006. As will be described in more detail below, a cataloging function involves assigning values to each of the attributes included in the metadata component for each asset defined in step 1006. Typically, this will take place either upon creating a new asset or when new assets are checked into the Vault 108. In any case, all attributes values should be assigned before an asset is checked into the Vault 108.

Some of the attribute values, such as time, date, and object size is typically filled-in automatically under program control. Other attributes are typically supplied by the creator or user of the asset management tool 102. Thus, support code for user interaction, typically implemented in the form of a dialog box or the like, is provided in step 1008. Additionally, a selection of common user interface functions may be provided by the program resources 100 of the present invention to facilitate the implementation of such services and to provide a common look and feel among diverse asset management tools 102. Note that the programming code of step 1008 consults the Data Model Manager for information about the asset type inserted in step 1006 to determine what attributes to request from the user. The programming code also uses this asset type (or data model) information in the Data Model Manager to ensure that values supplied by the user fall within the allowed ranges.

Note that not all asset management tools 102 will support cataloging. In general, cataloging is supported by asset management tools that provide a means for defining assets and/or checking in assets to the Vault repositories 108. However, some asset managment tools, such as asset browsers and the like, may not provide asset definition or checkin functions. Thus, if such functions are not provided, step 1008 is bypassed and the process continues with step 1010.

In step 1010, the tool developer provides support code for the checkin and checkout procedures. Again, most, but not all asset management tools 102 typically support these functions. Thus, if such functions are not provided, step 1010 is bypassed and the process continues with step 1012. If checkin and/or checkout is supported, the support code typically comprises code in the form of user interface components and the like. For example, a user typically selects which asset is to be checked in or checked out, and the location of the source and destination of such assets. After the required information is gathered via the user interaction or otherwise, a call via the program resources 100 provided by present invention is made to perform the actual checkin or checkout service.

In addition, some asset types may require specialized checkin and/or checkout procedures. For example, an asset type that has contents in multiple files in the local work area, may have a specialized checkin procedure that gathers all the multiple files before calling the checkin routine provided by the program resources 100. Similarly, a specialized checkout procedure may also be provided to restore the contents of an asset into its original multiple files and/or locations within the local work area.

In step 1012, the tool developer provides support code for other program functions that are supplied by the asset management tool via the program resources 100 of the present invention. Which functions are used depends upon what type of asset management tool 102 is being implemented. For example, some tools may have browsing or searching capabilities. Thus, depending on the functionality of the asset management tool 102, different program resources 100 of the present invention will be utilized and thus different support code will be required.

Next, as step 1014 indicates, the programming code of the asset management tool is built via a compiler or the like, and is linked with the program resources 100 provided by the present invention. Thus, an asset management tool 102 is created that is AMS aware. Next as step 1014 indicates, the process ends.

Typically, each asset management tool 102 defines its own unique types of assets. However, it is also common in production environments to have several tools that operate on the same types of assets. For example, in an animation film studio environment, common assets such as storyreels, sequences, scenes, cels and projects may be defined via the StudioLib 104.

Complex assets may refer to other assets and thus comprise a plurality of individual data files. For example, an asset defined as a sequence type (which represents a video clip, for example), can comprise a plurality of individual data files, each representing a single frame of the video sequence. Each still frame image is stored as a single data file. However, because the present invention allows asset management tools 102 to refer to assets types, asset management tools 102 need not specify each data file that comprises an asset. For example, an asset management tool 102 which operates on sequence data objects, only needs to specify a name of a sequence asset. The StudioLib 104 automatically translates the sequence asset into the plurality of individual components that comprise the sequence. Accordingly, the plurality of data files that comprise the sequence are stored, and/or retrieved to and from the asset storage system of the present invention (described below). Thus, the conversion of a sequence asset is transparent to the users and the asset management tools 102. Consequently, consistency among a variety of asset management tools is accomplished by using common asset definitions among diverse asset management tools.

For example, suppose that two video tools (such as 102*a* and 102*b*), operate on video sequence type data. Further suppose that each tool (102*a* and 102*b*) formats data differently in terms of their internal or tool-unique representations (i.e. unique data types, file hierarchy etc.). However, once data objects are checked-in to the asset management system of the present invention, (for example as an asset of type sequence), they are automatically converted from their internal tool-unique representations to a representation that is compatible with the asset management system of the present invention. Thus, a sequence type asset created by either tool can be subsequently checked out by either tool. Upon checkout, the reverse transformation takes place. That is the asset that is compatible with the asset management system of the present invention, is transformed into the tool-unique representation of whichever tool checks out the asset. Either tool can then modify the asset, and, if desired, check it back into the system. In this fashion, two tools which were previously incompatible with each other, are now able to operate and modify data that was created by the other tool. Furthermore, all of the necessary transformations of data are transparent to both the user of each tool and to the tools themselves.

Figure 9:
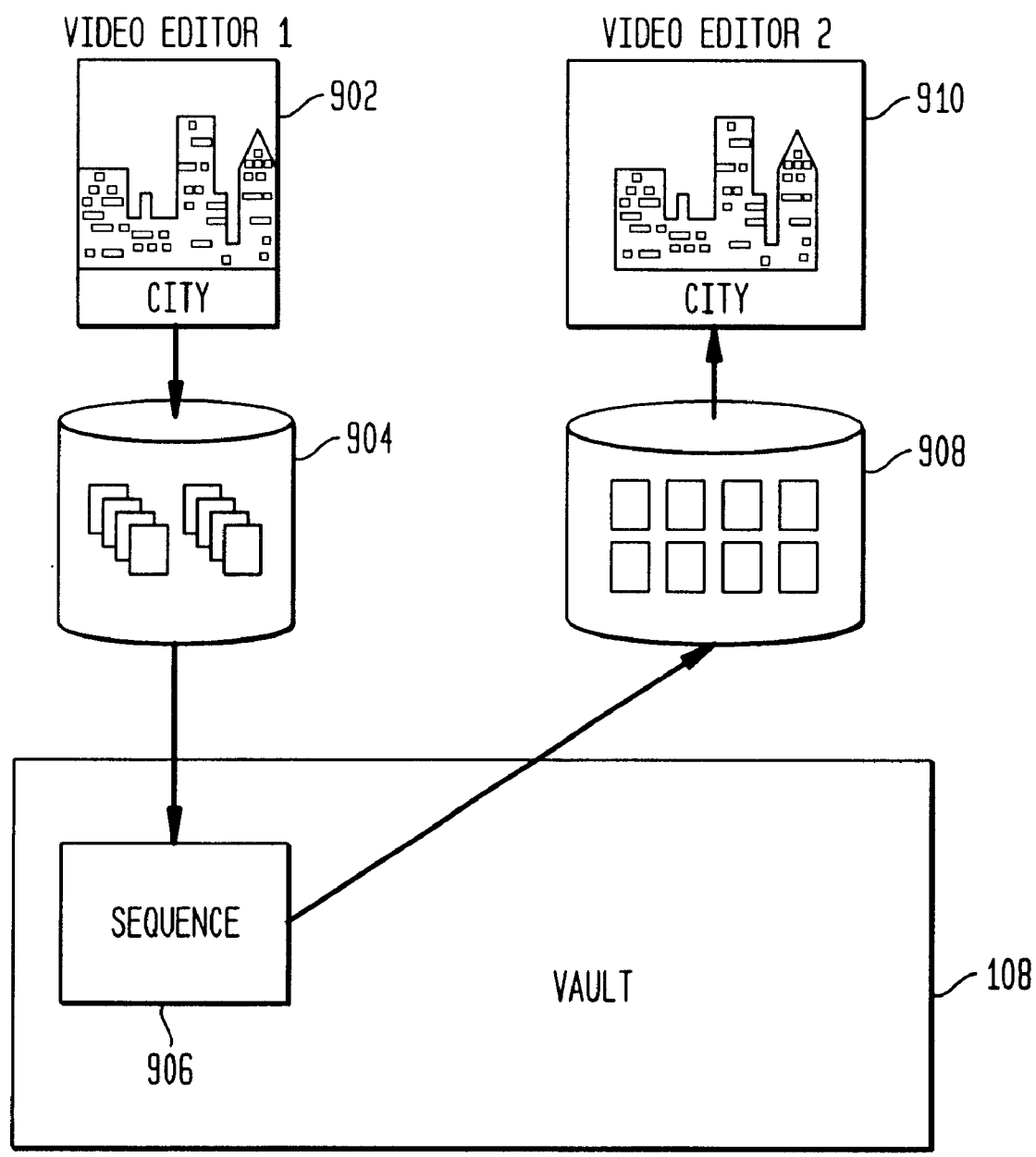
FIG. 9 is a block diagram depicting two asset management tools according to an embodiment of the present invention.

To illustrate this process, refer to FIG. 9. In FIG. 9 the video editor 1 902 creates a video sequence (depicted as a city 902). Video editor 902 stores the sequence into its local storage facility 904, as 8 individual still frame image files. The video editor 1 902 then checks-in the video sequence as an asset of the type sequence 906, into the Vault 108. Later, video editor 2, which also operates on assets of the type sequence 906, checks out the sequence 906. The sequence 906 is translated into 8 individual still frame image files in a format and structure that is unique to video tool 2 910. Note that internal tool-unique representations of the sequence asset is different within the local storage of video editor 1 904 and video editor 2 908. Notwithstanding this incompatibility both video editors 902 and 910 can share data assets that are provided to and from the Vault 108.

Additionally, the StudioLib 104 provides user interface services which can be called upon by asset management tools 102. This feature of the present invention provides a means to provide consistent user interfaces among a variety of diverse asset management tools 102. For example, a video editing tool (such as tool 902) calls upon the user interface services of the StudioLib 104, so that dialog box related to the retrieval of a video sequence data object is displayed to the user. A different asset management tool that operates on sequence data (such as tool 910), can also call upon the StudioLib 104 to produce the same dialog box as used by the video tool 902. Thus, not only can the two diverse tools 902 and 910, share data assets, but consistency in terms of user interfaces can also be accomplished. Similarly, other types of dialog boxes and other user interface components pro-vided by the StudioLib 104, can provide a common 'look and feel' among diverse variety of asset management tools 102.

As stated, assets are logically stored in a Vault repository 108*a*, 108*b*, 108*n*. That is, as far as the user, and the asset management tools 102 are concerned, all assets are stored in one or more named Vault repositories 108 (described below). Thus, for the purposes of the present disclosure, an asset is said to be stored in the Vault repository 108 or more simply the Vault 108. However, the actual physical location of assets (which are typically transparent to the user and the asset management tools 102), are provided by one or more asset storage servers 110, as previously described.

In one embodiment, the asset management server(s), 112 is (are) implemented using a DBMS for indexing and one or more file system volumes for the storage of the assets. The file system volumes can be located in various content servers which may reside in a single computer system or may be distributed among various content servers connected to the AMS 100, via a computer network or other connection (not shown). The system administrative function of the present invention (described below) defines these parameters.

Each of the components of the present invention, the asset management tools 102, the Vault API 106 and the StudioLib 104 will now be described in more detail below.

Asset Management Tools 102

Multimedia production tools that may become asset management tools 102, are those tools, utilities, and complex multimedia development systems, which are typically provided by a variety of manufacturers. Such manufacturers can use the present invention to modify their program code to convert their tools into asset management tools 102, according to the present invention. As stated, asset management tools 102 typically include a variety of content creation tools such as video film editors, painting programs, three-dimensional modeling utilities and animation tools.

In addition asset management tools 102 can include stand-alone utilities that provide services which operate on various types of multimedia assets which are stored and managed by the underlying DBMS and file systems. The services provided by such stand-alone asset management tools 102, can include for example, retrieving, storing, browsing, navigating, tagging, cataloging and previewing assets.

The services provided to asset management tools 102 by the present invention fall into five primary functions as follows: checkin/checkout; catalog; browse; query; and system administration. Examples of each of these functions will now be described below.

Checkin/Checkout (CICO)

Checkin is an operation that puts a new asset or a new version of an existing asset into the Vault repository 108. Checkout is an operation that retrieves a specified version of an asset from the Vault repository 108. Optionally a user may checkout an asset and lock the asset to inhibit another user from modifying the same asset. If this option is used, later checkin will only be permitted by the lock holder, which is typically the user that locked the asset upon checkout. If an asset is locked, other users are prevented from modifying the asset in any way, including the storage of a new version of the locked asset.

As stated, for some tools, CICO occurs transparently to the user (i.e. the user does not have to deal with the transfer to or from the Vault repository 108 explicitly). Such tools are referred to herein as being AMS aware. Other tools may not be integrated with the AMS. As such, these non-AMS aware tools may require additional steps to perform explicit CICO procedures via standalone applications, as previously described as will be further described below.

Cataloging (assigning attributes)

Cataloging is a process for specifying values for an asset's attributes. Cataloging may occur on two occasions: (1) each time an asset is checked in; and/or (2) during archival. At checkin time, some attributes are filled-in automatically. For example, the file size, modification date and time, creator, may all be filled-in automatically, under program control. Other asset attributes are provided by the user. For example, keywords used for searching, and indexing, names of attributes, and other comments are typically filled-in manually by users. At archival time, an archivist may add additional keywords to the asset attributes via the cataloger tool, if desired. As described previously, the cataloging function may be helped by the use of the Data Model Manager object provided in StudioLib 104. The Data Model Manager helps the cataloging function ensure that all the necessary attributes of an asset type are supplied for check in and that the values are within the permitted ranges.

Browsing and querying

The contents of the Vault repository 108 are organized into structures that are useful to the user. Organization is a task that is typically performed by a system administrator of the like. For example, it would be convenient to collect all assets that are created for a particular animation feature under a single asset tree. In this example, the root of the tree is an object that represents the production. Leaves represent the sequences of the feature. In addition, the leaves of a sequence represents the scenes that make up the sequence. A scene, in turn, may comprise subtrees that represent the 'ruff,' 'cleanup' and 'color' variants of the scene.

Browsing is accomplished when a user navigates through an asset tree. While browsing, the user views the contents of an asset tree and the nodes and leaves that comprise the assets of a particular tree. Browsing is very much like navigating the directory hierarchy of a file system.

Querying involves describing the assets of interest, rather than navigating through the structure of the Vault repository 108. A query is formed by specifying the desired values for asset attributes, including keywords. When the query is executed, a set of matching assets is returned. The user can then browse through this set, rather than browse through the entire Vault repository 108.

System Administration

The activities that fall under system administration can include: configuring content servers (described below); specifying the content servers where different assets should be placed; setting access controls; specifying which versions of assets should be kept online, nearline and offline storage; specifying how many copies of (a version of) an asset to have online for performance and availability reasons and where these copies should be placed; systematic monitoring and reporting of AMS operations; and periodic adjustments to configurations to maintain proper performance.

These activities may be performed manually by a system administrator or production manager, or automatically, under program control of a production management system. In either case, operational policies are typically set by the production managers after consulting the producers and directors.

Examples of Tools and their use of the Vault 108

Figure 2:
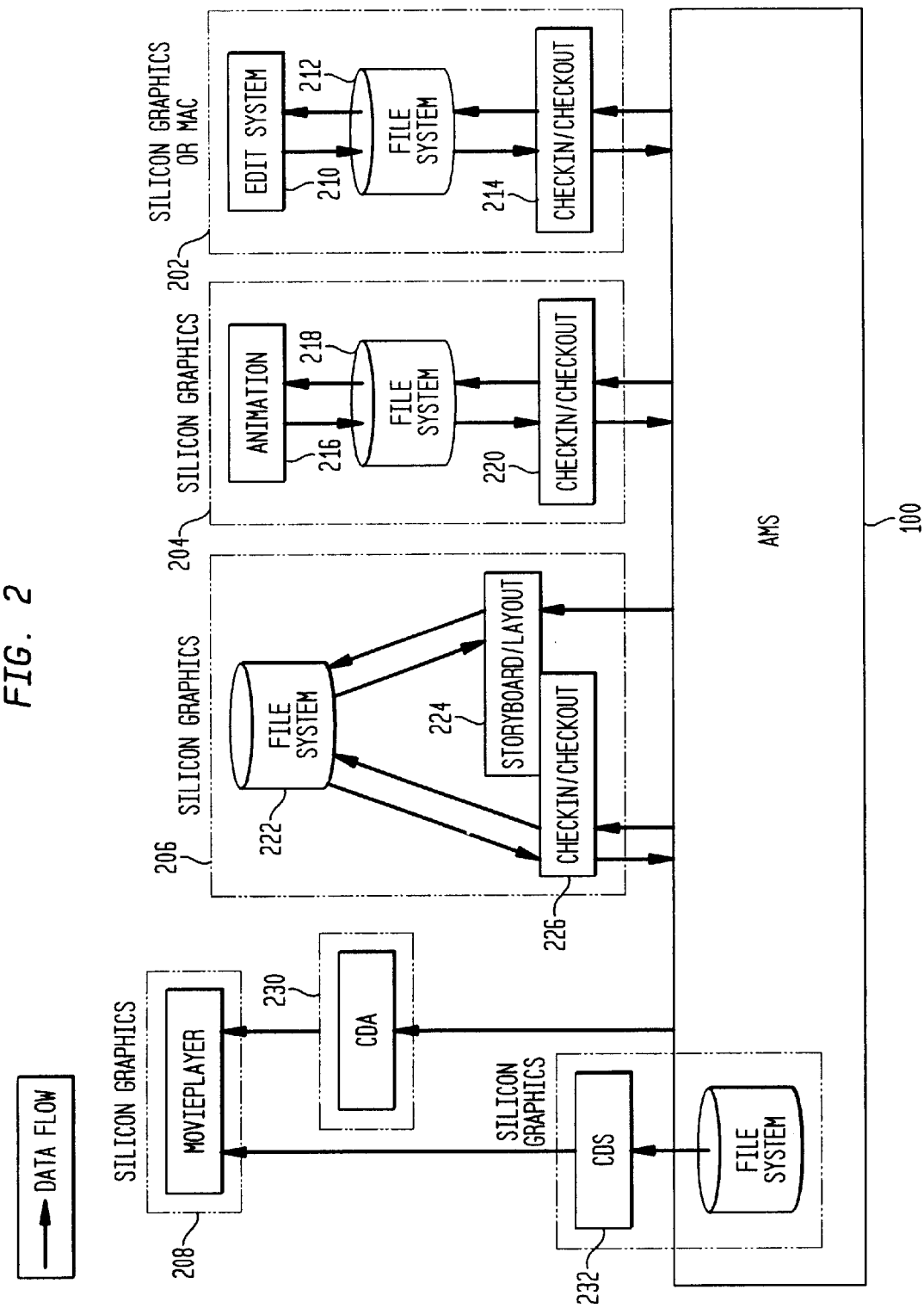
FIG. 2 is a block diagram depicting a typical operating environment according to an embodiment of the present invention.

In FIG. 2, an example operating environment of the present invention is depicted. In this example, four studio production tools 202, 204, 206 and 208 are depicted. This example environment shows the various methods in which diverse production tools running on diverse computer platforms can become integrated with a production environment according to the present invention. Production tools 202, 204, 206 and 208 are interconnected via appropriate connectivity means such as a computer network (not shown). Additionally each production tool is connected via appropriate connectivity means such as a computer network (not shown) to the Vault repository 108.

Production tool 202 depicts the use of a stand-alone Checkin/Checkout tool 214, as a means for interfacing with the Vault 108. In this example, system 202 includes an editor's tool 210. The edit system may be executed on different computer platforms and/or different computer systems for example, a Silicon Graphics, Inc. (SGI) computer system or a Macintosh ('Mac') computer system. In this example, suppose the user on the computer system 202 requests a data asset of the type 'storyreel' (not shown) which is stored in a Vault repository 108.

The Edit System 210 is a tool that is not AMS aware. Nevertheless, the Edit System 210 is still an integrated part of the development environment provided by the present invention. This is accomplished through the use of the stand-alone asset management tool 214, which is AMS aware. In addition the stand-alone CICO tool 214 is specifically designed to work with the file management system 212 of the Edit system 210. Thus, for example, the stand-alone CICO tool 210 is used to checkout an asset from the Vault of the type storyreel. The storyreel asset is then transformed via program resources 100 residing in the CICO tool, into for example, the appropriate set of JPEG compressed OMF files that comprise the asset. These files are then delivered by the CICO tool 214 to the file system 221 in a unique-tool format that is required by the Edit System tool 210.

As previously stated, the CICO 214 knows what it means to checkout an asset such as a storyreel. Thus, the user need not explicitly request each of the files associated with a storyreel. This knowledge is accomplished by a storyreel object in the StudioLib class library 104. It is in the checkin/checkout methods contained in the storyreel object that knowledge about particular applications (i.e. the Edit System's 210) use of file names and directory hierarchy is encapsulated. Thus, the user typically issues a simple checkin command, such as a keystroke, or a mouse click, to express a desire to work on the next version of the storyreel. The CICO tool 214 checks out the appropriate files comprising such storyreel and deposits them in the proper directory hierarchy, under the proper file names within the file system 212 contained in the computer system 202.

After the user is finished modifying the storyreel, the standalone CICO tool 214 is executed so that the files from the file system 214 are checked into the appropriate Vault repository 108. As with checkout, a simple checkin command such as a keystroke, or a mouse click will be performed. The CICO tool 214 knows the directory hierarchy (contained in the file system 212) used to represent the storyreel and will determine which files have changed and needs to be checked in. The checkin tool will query the user if necessary, to complete attribute information (described below) as needed to be stored along with the storyreel into the Vault repository 108.

Note that the storyreel assets in the user's file system 212 are outside the control of the present invention, and are not linked in any way to the storyreel assets in the Vault repository 108 of which they are a copy. Also these files within the file system 212 are not necessarily deleted at checkin. It all depends upon the policy that the checkin tool implements.

In the second example, computer system 204 comprises an SGI workstation running an off-the-shelf animation software program 216 to generate three dimensional (3D) images. A 3D artist uses the Animation program 216 in exactly the same way as an editor uses the edit system 210. A 3D artist uses the workstation's stand-alone CICO tool 220 to checkout assets from the Vault repository 108 to the file system 218 for the Animation program 216. checkin is accomplished via the reverse procedure. Just as the CICO tool 214 knows what it means to checkin and/or checkout a storyreel, the CICO tools 220 knows how to checkin and/or checkout a project asset, which in this example, is the type of asset in which the animation program 216 operates upon. Note that tools 220 and 214 may be the stand-alone CICO tool.

In a third example, the storyboard and layout tool 224 have the CICO library 226 incorporated in its address space. In other words, the storyboard and layout tool 224 is an integrated asset management tool that is AMS aware. Thus, typically, the CICO process is completely transparent to the user. The storyboard/layout tool 224 modifies the copies that are cached in its local file system 222, flushing them to the Vault repository 108 with calls to the CICO services as appropriate, according to the particular implementation of the asset management tool 206.

Additionally, the storyboard and layout tool 224 can be used to call on the Vault repository 108 for other than checkout/checkin purposes. For example, such tool 224 can be used to read or modify attribute values and/or to read an asset directly. Preferably, such accesses to the Vault repository 108 will be supplied via objects in the StudioLib 104, but as previously stated, calls to the Vault API 106 may be made directly by an asset management tool, such as asset management tool 206.

Another class of tool is a read-only type tool. Read only tools cannot modify assets in the Vault 108, and thus provide checkout procedures, but not support for checking assets into the Vault. An example of a read only tool is a movieplayer 208. The movie player tool is an example of a tool that is unique because assets read from the Vault repository 108 must be delivered at a particular rate, (e.g., 24 or 30 frames per second for movies and video respectively). The present invention provides support for constant frame rate (CFR) services by providing program resources 100 that are specifically designed for the purpose. In particular the CFR Delivery Agent (CDA) 230 and the CFR Delivery Server (CDS) 232 to support CFR.

The movieplayer 208 functions as follows. When the movieplayer 208 plays a movie, it first makes a request of the CFR Delivery Agent (CDA) 230. The CDA selects a copy of the movie from which the desired frame rate could be delivered at that moment and from which network bandwidth to the movieplayer can be reserved. Once the disk and network bandwidth are reserved, the movieplayer 208 contacts the chosen copy's CFR Delivery Server (CDS) 232 to get the contents. The CDS 232 is allowed access to the file where the Vault repository 108 stores the contents of the selected copy and reads directly from it to ensure that it can deliver the bits at the requested rate.

A more detailed description of the working and interactions of the movieplayer with Silicon Studio's CFR service is subsequently provided herein.

The Vault Repositories 108 and the Vault API 106

Features

The features provided by the Vault API 106 includes storage means for both metadata and content data. As stated, information about assets, such as attributes, etc., is referred to as the metadata component of the asset. The contents of an asset itself is referred to as the content component of the asset. Physically, the Vault repositories 108 are merely abstractions of one or more DBMS(s) and file system(s). However, as previously stated, for the sake of simplicity, assets are described herein as being stored in and retrieved from the Vault repository 108, or merely the Vault 108. A more detailed description of the physical implementation(s) of the storage and indexing of the Vault repository 108 are described herein. Below are examples of features that are provided by present invention via the Vault API 106.

Immutable versions.

An asset is preferably stored as a collection of versions in the Vault repository 108. Whenever an asset is modified in the Vault repository 108, a new version is created for it. Preferably, old versions are never overwritten and may be accessed as needed, as long as they haven't been deleted explicitly by a system administrator or the like. Additionally, the Vault API 106 may support unversioned assets. Unversioned assets are overwritten is modified. An asset is typically declared as either Versioned or unversioned at creation time and it stays Versioned or unversioned from that point on.

Shared development.

As previously stated, the Vault API 106 provides a checkin and checkout means for coordinating modifications of assets by multiple users of the present invention. A user may prevent others from modifying an asset by checking out the asset with a lock. The locking user then release the lock on the asset when such asset is subsequently checked-in, presumably after modifications have been made.

Cataloging.

Different attributes, e.g., type, date created, and keywords, may be associated with an asset when stored in the Vault repository 108. Many tools derive and store much of this associated information automatically on behalf of the user. Examples of such derived information may include the date and time an asset is created, as well as the identity of the creator.

Relationships among assets.

The present invention provides a means for users to link related assets within the Vault repository 108. For example, it may be reasonable to link a scene asset to the assets that are its frames, or a frame to the set of cels that were used to compose it, or a cel to the color model used to paint it. These relationships provides another means for capturing important information about assets.

Relative naming.

Typically, users access assets through its relationships. The Vault API 106 provides support that facilitates this process. For example, with a scene in hand, a user may request the scene's first frame by simply querying the Vault API 106 for the asset which is named "frame[1]" in such scene.

Access control.

The Vault API 106 permits an authorized person, for example, the production manager, to specify who has access to particular public assets and who may modify particular public assets. In addition, individual users control when assets they are developing in their private workspaces, are to be made public and available to others, via the Vault repository 108.

Searching by annotations.

Procedures that may be performed by a client with the searching support provided in the Vault API 106 include searching for annotations or keywords that are associated with an asset, via metadata, as previously described. For example, a user can launch a query for finding all backgrounds (one kind of annotation) that have a particular keyword (another kind of annotation). Another example, a user can launch a query for finding all drawings that are linked and painted by a particular user, for example, in the past month.

Accommodating new asset types.

The present invention provides for the addition of new asset types, which may be stored in the Vault repository 108 without requiring that the Vault API 106 be recompiled or changed in any way.

Hierarchical Storage Management (HSM).

The Vault repository 108 uses online, nearline and offline storage for holding the contents of the assets entrusted to it. The present invention provides support to implement various policies for migrating assets among these levels in the storage hierarchy.

Replicas.

The contents of assets in the Vault repository 108 may be distributed among content servers in different machines, including client workstations. An asset that is stored in the Vault may have multiple copies of its contents in various content servers to ensure better availability and performance. A user may change the number of copies and their locations dynamically.

Support for CFR delivery.

In addition, the Vault API 106 provides support (such as client control of content placement and direct access to content files) so CFR delivery of its assets may be implemented.

Services

The services provided by the Vault API 106 are described below. The Vault API 106 supports three classes of objects, namely, repository objects 108, asset managers objects (not shown), and data objects (assets). Each of these classes of objects will be discussed below.

As stated, a Vault repository 108 is an abstraction of a database. It serves as a container for data objects. A data object resides in exactly one repository. However, an object in a repository (such as repository 108a, for example), may reference objects in another repository (such as repository 108b, for example).

An asset manager object maps repository names to repository objects 108. A user gains an object reference to a repository from the repository's asset manager. Typically a studio will have one asset manager per site.

An organization may use a repository for any natural grouping of assets. Even though assets may be organized in finer grained units, a studio is just as likely to use one repository per feature production. In this case, everyone who is working on a particular production will use that productions's repository to store and share their work.

As stated, an asset is comprised of its contents (data) and metadata (i.e., data about the asset). The combination of data and its associated metadata is referred to herein as an AMS data object (or asset). An image is an example of contents. The information that the image is a JPEG 240 X 320 file is an example of metadata. To store a version of an asset in the Vault repository 108, such asset is be converted into an AMS data object.

The asset's metadata are stored as attributes of its AMS data object. For example, the 'type' attribute of an object may be set to the string 'JPEG' to denote that the contents is a JPEG image. Contents may be saved with the AMS data object and stored in an content server of the Vault repository 108. Alternatively, the asset's contents may be stored outside of the Vault repository 108 and a pointer (e.g., file name) to where the contents are located stored as an attribute in the AMS data object.

Preferably, the contents of each asset are stored directly in the Vault repository 108 so that the present invention can control the guarantee the integrity of such assets. Additionally, this method is preferred so that content based searches (e.g., adaptive pattern recognition) can be performed. However, it is sometimes impossible to store the contents of assets in the Vault repository 108. For example, non-digital contents such as paper drawings cannot be stored in the Vault 108. Thus, in this case, the Vault repository 108 merely contains a pointer to the locations where such contents are actually stored.

Metadata data tables

In a preferred embodiment of the present invention, attributes are stored in separate tables to facilitate efficient searching of assets stored within the Vault repositories 108. In addition, an asset table comprising all of an asset's metadata in the form of a 'property list' comprising attributes (described below) is maintained.

Figure 11:
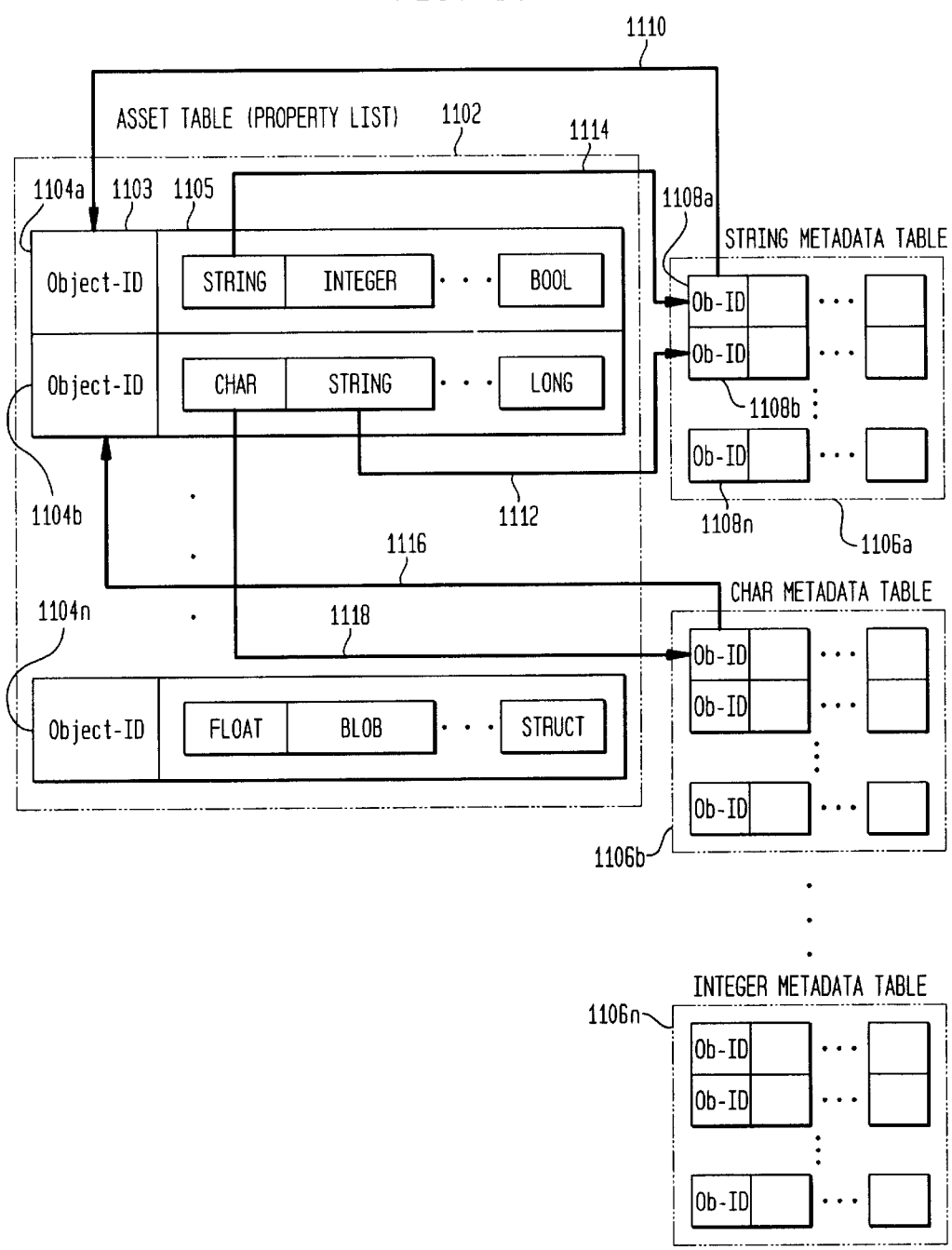
FIG. 11 is a block diagram of an asset table and plurality of metadata tables according to a preferred embodiment of the present invention.

Referring now to FIG. 11, an asset table 1102 is depicted. In addition a plurality of separate tables 1106a, 1106b, . . . , 1106n (generally 1106) is depicted. The asset table 1102 comprises a plurality of asset entries 1104a, 1104b, . . . 1104n (generally 1104). Each asset entry 1104 comprises two columns. The first column 113 comprises the object-ids of each asset entry 1104. The second column 1105 comprises a 'blob' data type comprising all of the attributes associated with each asset entry 1104.

The attributes comprising the second column 1105 of each asset table entry 1104 comprises a variable number of attributes. In this example, only the data types for each attribute is depicted. For example, the types String, Integer, and Bool are depicted for entry 1104a. Each box depicted within the second column 1105 represents a particular attribute for the associated asset. Each attribute typically comprises three elements: (1) an attribute name; (2) an attribute value; and (3) an attribute type. The type is selected from a predefined list of types. As will be described below, each predefined type is associated with one of the separate metadata tables 1106. Such types typically include types such as bool, char, date, float, long, string, object-id, blob, struct and vectors of the basic types.

Note that each entry 1104a can have a variable number of attributes within the second column 1105. Each attribute is also stored in a separate metadata table 1106. For example, a string metadata table 1106a is depicted in FIG. 11. The string metadata table contains a plurality of entries 1108a, 1108b, . . . 1108n (generally 1108). The string metadata table 1106a comprises all of the attributes of the type 'String' contained in the asset table 1102. Similarly the Char metadata table 1106b comprises all of the attributes of type 'Char' contained in the asset table 1102. Likewise, the Integer metadata table 1106n comprises all of the attributes of the type 'Integer' contained in the asset table 1102. In a similar fashion, a separate metadata table 1106 is maintained for each predefined list of types that are valid types for attributes. Note that attributes of an asset are automatically split into the metadata tables 1106 by the present invention and is transparent to the asset management tools 102 that use programming resources 100.

For example, as depicted by the arrow 1114, the 'String' attribute (name and value) associated with the asset in entry 1104*a*, is stored in the String metadata table 1106*a* in entry 1108*a*. Note that the same entry 1108*a* also comprises an object-id which maps back to the asset represented by the entry 1104*a* in the asset table 1102, as depicted by the arrow 1110. Thus the object-id serves to link both tables together. Similarly, the 'String' attribute associated with the asset entry 1104*b* is also stored in the String metadata table 1106*a*, as depicted by the arrow 1112.

Similarly, as depicted by the arrow 1118, the 'Char' attribute (name and value) associated with the asset in entry 1104*b*, is stored in the Char metadata table 1106*b*. Note that the same entry pointed to by the arrow 1118, also comprises an object-id which maps back to the asset represented by the entry 1104*b* in the asset table 1102, as depicted by the arrow 1116. Thus the object-id serves to link both tables together.

This architecture facilitates fast and efficient search and query capabilities of the present invention. It also provides for a choice of whether to permit searching capabilities for particular assets. For example, if searching capabilities for a particular asset is not desired, the attributes associated with such asset is not duplicated within the separate metadata tables 1106. However, if searching capabilities are desired, the architecture of the separate metadata tables provides for fast and efficient searches.

For example, suppose a list of all assets created by 'John Doe' is desired. In this case, assume that an attribute named 'Creator' having the type 'String' has been predefined. Thus, a search of the string metadata table 1106*a* is conducted until a set of matches if found. The search is fast because each entry is known to contain only a string value. Finally, a list of assets, identified by the object-ids in the string metadata table 1106 is presented.

Note that if only the asset table 1102 were provided, even a simple search such as the one in the preceding example, would be complex and inefficient, assuming that such table is made searchable. This is because each entry in the asset table comprises a variable set of attributes of different types. In addition, such attributes are presented in no particular order. Thus, each column in each entry 1104 in the asset table 1102 would have to be searched in order to look for a particular value of a particular asset.

Attributes and references

Preferably AMS data objects have a set of mandatory attributes (metadata). These attributes are: object-id, versionName, versionNumber, type, is Versioned, dateCheckedOut, dataCheckedIn, contentSize, accessControlList, and replicaLocations. Some of these are set automatically by the invention either when an asset is checked in or when it is checked out.

In addition, there is another set that all AMS data objects are encouraged to include. These are: displayName, representationType, typeVersion, creators, description, notes, keywords, associatedApp, thumbnail, preview, derivedFrom, and physicalAssetLocations.

Each of these attributes will now be described in detail.

Object-id

This is a data object identifier that is provided by the Vault API 106 when an asset is created.

versionName

This is the name of the object's branch in the version tree (e.g. 'background' or 'background.4.retouched'). Version names are unique within a repository. For new version trees, a name may be provided by the user, or the Vault API 106 will generate a unique name.

versionNumber

This field gives the version number of the object along its branch. For example, if the object is 'background.4.retouched.3,' its version number is 3 (and its versionName is 'background.4.retouched').

displayName

Clients may use this field to associate an alternative name with the data object.

type

This field contains a string that identifies the type of the asset, e.g. 'image'.

typeVersion

This field may be used as a fine-grain distinction for the type of an asset.

representation Type

This field contains a string that identifies the representation or format of the asset. For example, an object of type 'image' may have 'GIF', 'TIFF', etc. as its representational type.

isVersioned

This can be TRUE of FALSE if the user created the asset as versioned or unversioned respectively.

creators

Name(s) of person(s) who created the data object.

dataCheckedOut

Date the asset version was checked out for modification. Note: This value is set by the present invention.

dateCheckedIn

Data the asset version was checked in. Note: This value is set by the present invention.

contentSize

The size of the object's contents (not including metadata) in bytes. This value is set by the present invention.

description

A paragraph or two to describe the asset version.

notes

Notes kept with the data object.

keywords

Keywords associated with the asset version.

associatedApp

Name of the application used to create the data object.

thumbnail

This field contains the AMS data object identifier of the asset version's thumbnail. Generally, a thumbnail is a small (postage stamp sized) image of an asset, which may be used to display a representation of the contents of a version of a particular asset. Typically, a user can launch an asset's application (if available) from the thumbnail icon.

preview

This field contains the AMS data object id of the asset version's preview. For an image, a preview is typically a lower-resolution version of the image. For a video object, a preview may be lower-resolution versions of some choice segment. For CGI, a preview may be an image that contains polygons/triangles/lines. The idea is to give the user a representation of an asset in such a way that is fast and convenient, without having to display the actual contents of the asset, which in some cases may be time and/or resource consuming.

derivedFrom

Identity of the AMS data object from which this one was created.

replicaLocations

This field tells how many copies there are of the object's contents and where in AMS they are located.

physicalAssetLocation

For a non-digital asset, this field may be used to remember how to find it, e.g. 'building 21, shelf 14, bin 5'.

accessControlList

This field determines who is allowed access to the data object's digital contents.

Additional (user defined) attributes

In addition to those enumerated above, an AMS data object may have additional attributes stored with it. Each attribute is given a unique name, a type and a value. The type that is associated with an attribute is typically constrained to a predefined set, such as bool, char, long, string, etc. Typically every instance of the same asset type (e.g. cel, frame, scene, sequence, project), will use AMS data objects that have the same set of defined attributes.

References in Assets

As used herein, references (or relationships) are attributes whose values contain identifiers of other AMS data objects. Thumbnail, previews, and derivedFrom, as previously described, are references, for example.

There are some asset types whose purpose it is to capture structure. Such assets do not possess content of their own. The main pieces of information such assets carry are the identities of the AMS data objects they refer to in their reference field, and possibly an ordering on such referenced objects.

Figure 3:
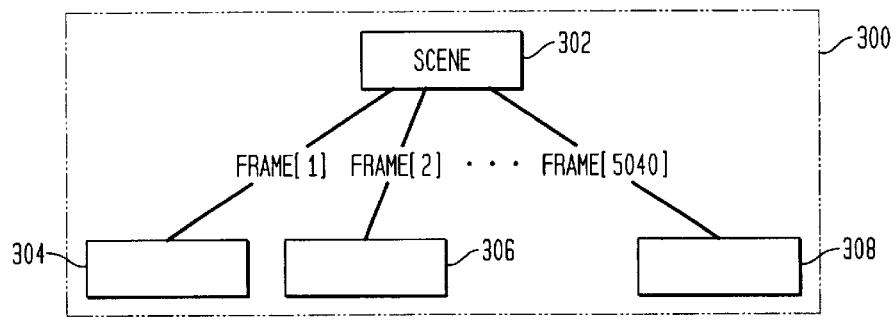
FIG. 3 is a block diagram depicting a representation of a data object according to an embodiment of the present invention.

For example, referring now to FIG. 3, a scene 300 may be represented by an AMS data object 302. This object 302 has a 'frame' attribute that references the sequence of JPEG images frame [1] 304, frame[2] 306, . . . Frame [5040] 308. Such AMS data objects that reference other objects are referred to herein as 'structured objects', in contrast to objects that do not reference other objects which are referred to as 'simple objects'. An example of a simple object is the AMS data object represented by Frame [5040] 308.

As stated, another reference that some asset types may define is derivedFrom which relates the asset to the AMS data objects from which it is derived. For example, an asset that is the result of composing three cels would be derivedFrom these three cels.

Versioning Assets in the Vault

In one embodiment of the present invention, assets in the Vault 106 are immutable. That is, whatever a user modifies an asset and checks it back into the Vault 106, a new version (a new asset with its own unique object) is automatically created. Additionally, as previously stated, assets can be created as unversioned assets, in which case, such assets are overwritten with new assets when modified.

Version Trees

Versioning is a special type of data object relationship that is supported by the Vault API 106. Related versions are organized as trees in the Vault 106. A line of versions that have the same name as the first version is considered the trunk of the tree. For example, in FIG. 4, a version tree is depicted whose trunk is 'scene1. Each version of 'scene1' such as version 1 413, version 2 414 and version 3 416 is a separate asset.

Traversing a branch represents pursuit along a particular path of development. For example, in FIG. 4, three branches are depicted: branch scene1 402, branch rotund_butcher 404, and branch Ed 408. The versions along the rotund_butcher branch 404 suggest pursuit of an alternative to scene 1, where the butcher is portrayed for example, as a rotund and jolly fellow. In this case two versions of a rotund_butcher are depicted, version 1 410 and version 2 412. Versions in a branch represent changes and refinements along the alternative represented by the branch.

An example of the use of versioning may be as follows. Jo, the storyboard artist, after roughing out a sequence stores it in the Vault repository 108 (for example version 1 410). She then asks Ed, a fellow storyboard artist to take a look. Ed checks out a branch from Jo's version 410 so as not to interfere with Jo's work. After he makes his changes (represented by versions 416 and 418), he then checks them into the Vault repository 108 and calls Jo to let her know. Jo takes a look at Ed's versions (416 and/or 418). If she likes what she sees, she could adopt Ed's version by simply incorporating it into her branch (as the latest version 2 412).

Names

Preferably, there are three ways to name versions in the Vault repository 108: object-ids, absolute names, and relative names. Each method of naming versions will now be described.

Object-ID Names

Each asset is automatically assigned a unique object ID when it is created (checked-in) to the Vault repository 108 (via the objectID attribute as previously described). Thus, any asset may be referenced (i.e. checked-in, checked out, etc.), by specifying its unique object ID.

Absolute Names

Absolute names in version trees are referred to herein as dot names because dots are used as separators. Every object has exactly one dot name. For example, in FIG. 4, the latest version of the scene1 asset has an absolute or dot name of 'scene1.3' 416.

Partially specified dot-names

Figure 4:
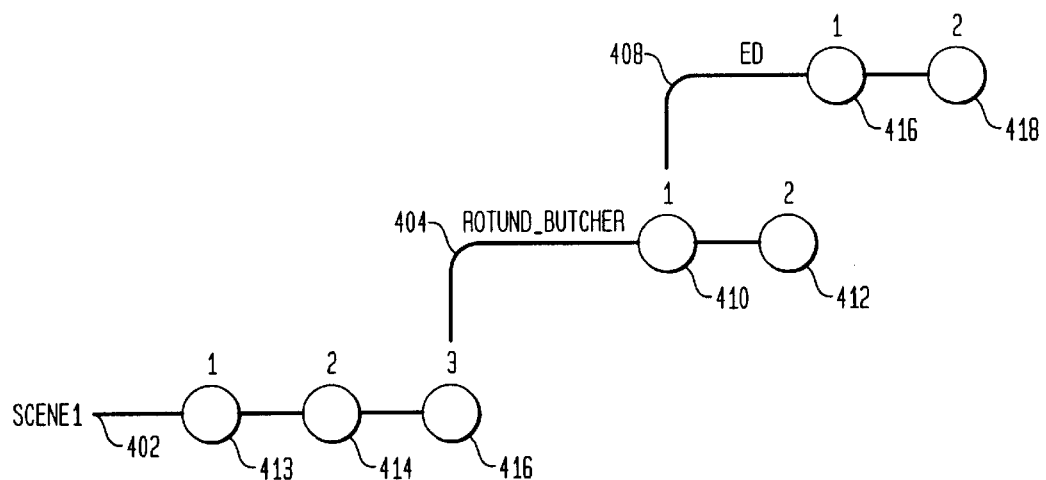
FIG. 4 is a block diagram depicting a representation of a family tree of versions of data assets according to an embodiment of the present invention.

An object may be named with a partially specified dot-name (p-dot name) (p stands for partial), or a fully specified dotname (f-dotname) (f stands for full) in the Vault API 106. The Vault API 106 follows rules for resolving a p-dot names into a fully specified f-dot-names. An example of a p-dot name is 'scene1'. When such a name is presented to the Vault API 106 it is resolved into the latest version on the specified branch. In this case, as can be seen in FIG. 4, the p-dot name 'scene1' is resolved into the f-dot name 'scene1.3' 416. (In this case, an intermediate version described as 'scene1.2' 414 also depicted in FIG. 4, is ignored because it is not the latest version).

As another example, the p-dot name 'scene1.rotund_butcher' is resolved to its latest version on the branch, namely, 'scene1.3.rotund_butcher.2' 412. If there were no 'rotund_butcher' branch in FIG. 4, 'scene1.rotund_butcher' would not resolve into any f-dot name.

Relative Names

In addition to object IDS and absolute names, data objects in the Vault repository 108 may also be named with relative names. One form of relative naming uses attributes that references other assets. For example, suppose an attribute called 'girlfriend' in an asset named 'Bambi' is assigned a current value of 'Faline' (this value refers to another asset whose absolute (partial) version name is 'Faline'). Thus, without having to remember the name 'Faline', the Faline asset may be referenced by specifying the relative name 'Bambi.1/girlfriend'. The Vault API 106 will resolve this name into the appropriate asset name.

Figure 5:
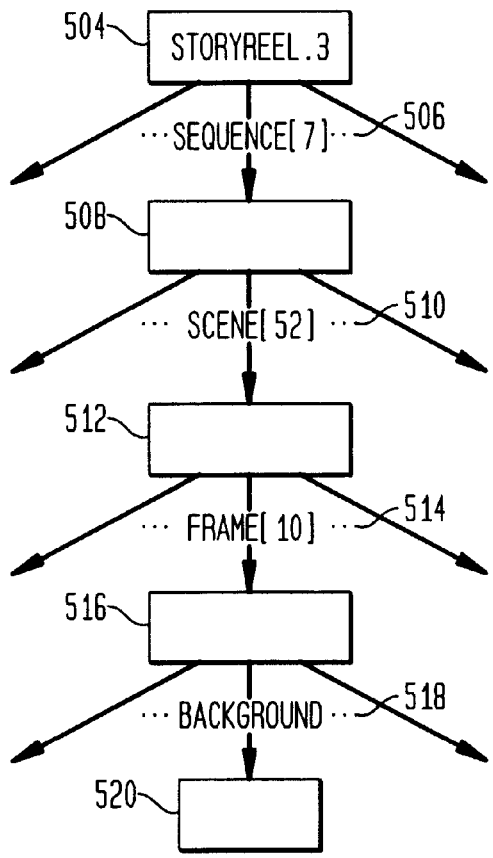
FIG. 5 is a block diagram depicting a representation of a data object represented by references to other assets.

Relative naming uses slashes to denote a hierarchy structure, similar to that used with many file systems (such as the UNIX file system). For example, the slash name 502 in FIG. 5, names an object that is the background of frame[10] of scene[52] of sequence[7] of storyee1.3. The assumption here is that the storyee1 object 504 has an attribute which is an array of object IDS named 'sequence'. In this case, one value of the array attribute points to a particular sequence (depicted as the arrow 506 which references sequence [7]). (The standard square bracket notation is used for indexing an object-id in an array.) The actual asset which is pointed to by the array attribute 506, is the sequence[7] asset 508. The sequence[7] asset 508 has an attribute named 'sheet' 510 that references the scenes of the sequence. The scene[52] object 512 has an attribute named 'frame' 514 that references the frames of the scene. Finally, the frame[10] object 516 has an attribute named 'background' 518 that references the background of the frame 520.

An object may have zero or more slash names. The background image in FIG. 5 may have two slash names if it has not changed since that last version of storyree1. That is, it may be reached through the name storyree1.2/sequence [7]/scene[52]/frame[10]/background as well as storyree1.3/sequence[7]/scene[52]/frame[10]/background.

Referencing an asset instead of an asset version (delayed binding)

As described thus far herein, an AMS data object refers to a particular version of a particular asset. For example, 'frame[9]' of a scene refers to a data object identifier of a particular version of frame[9]. However, it is sometimes desired to always refer to the latest version of an asset rather than the latest version at the time the asset is checked in. The present invention provides support for such a function in the Vault API 106.

The present invention includes with every branch (including the trunk) of as asset's version tree, a special data object id called the zeroth version id. Whenever a zeroth version data object id is specified, the Vault API 106 resolves it to the latest version in its branch at the time of use. For example, to have frame[9] always refer to the latest version along the trunk, the user simply refers to the zeroth version of the trunk.

Checkout/checkin

Versioned objects in the Vault repository 108 are not modified in place. If a user wants to modify an object, a new version of the object is first created. To do this, the user reserves the dot name of the version he wants to create, which effectively prevents or locks out other users from creating that particular version. Later the user checks in the changes under the reserved dot name. For example, to continue the development of the scene1 branch 402 in FIG. 4, a user would reserve and later checkin his new version under scene1.4.

The Vault API 106 does not permit reservations that will create gaps in the version tree. For example, in FIG. 4, a client will not be allowed to reserve scene1.5 until a scene1.4 version exists.

Checkouts through slash names and object ids.

As previously stated, to modify an asset, a client performs the following. The client determines where in the version tree a new version will reside. Next the client reserves the dot name that represents such position in the version tree. Next the client creates a new version and finally, checks-in such version under the reserved dot name.

A dot name, as stated, begins with a user-given name (for example, 'LionQueen'). Thus, if dot names are the only way that checkouts are permitted, users wold be required to supply names to all assets. Additionally, conventions would have to be invented and enforced so that all users working on particular assets will know the correct names. For example, an asset named 'LionQueen_sequence1_ scene1_penciltest_xsheet', refers to the pencil test variant of the x-sheet of scene1 of sequence1 of the production Lion Queen.

Figure 6:
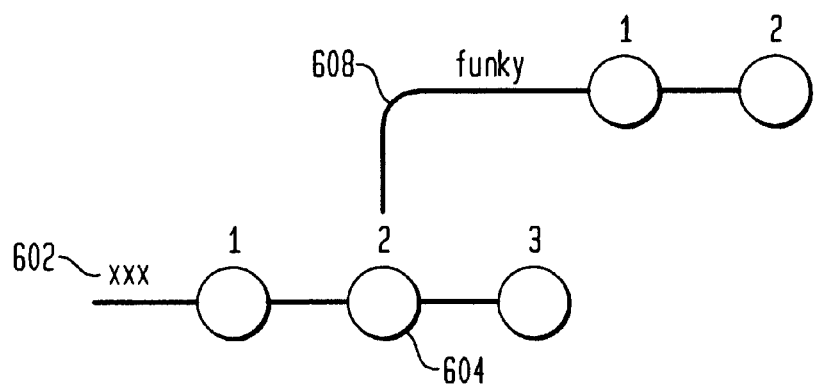
FIG. 6 is a block diagram depicting a representation of a tree of data assets according to an embodiment of the present invention.

The present invention provides a better way. The Vault API 106 permits checkouts to be made relative to data objects made with either slash names or object IDS. For example, the command 'reserveVersion('LQ/sequence[1]/ scene[1]/penciltest/xsheet')' will reserve the next version in the branch that the AMS data object with the slash name 'LQ/sequence[1]/scene[1]/penciltest/xsheet' is in . For example, if 'LQ/sequence1/scene1/penciltest/xsheet' refers to xxx.2 604 in FIG. 6, then xxx.4 (not shown) will automatically be reserved.

In addition, the command 'reserve('LQ/sequence[1]/ scene[1]/penciltest/xsheet', '2.funky.3')' will reserve version 3 of the funky branch 608 of version 2 of the asset of which 'LQ/sequence[1]/scene[1]/penciltest/xsheet' is a version. Again, if 'LQ/sequence[1]/scene[1]/penciltest/xsheet' refers to xxx.2 604, then xxx.2.funky.3 (not shown) is reserved.

The object id (see attributes and references, herein) of 'LQ/sequence[1]/scene[1]/penciltest/xsheet' may be used instead of the slash name in the example above.

Queries

In addition to navigating version trees and references, data objects in the Vault repository 108 may also be found with queries. Queries are boolean expressions of attribute comparisons. For example, the query "(creator='James B') AND (keyword='sunset')"will return the id and type of all objects that James B created that have the keyword 'sunset' associated with it.

Access Control

Access control in the Vault repository 108 is based on access control lists (ACLs). An ACL identifies the users that are permitted access to the objects the ACL controls. When a user asks to access an object, his user id is checked against either the read, write or administrative ACL. The user is allowed access only if his user id is in the ACL.

Each object has an ACL that controls who can read the object. Each branch in a version tree has an ACL that determines who can create the next version in the branch. Each repository has an ACL that controls who can change the ACLs of objects and version branches in the repository. In addition to these system administrators, a creator of an object has the right to change the (read) ACL of the object and a creator of a branch has the right to change the ACL of the branch. The creators of a branch are the creators of the first version of the branch.

With the ACL mechanism, an authorized user (such as the system administrator and/or production manager of the like) will be able to control the following types of accesses including: (1) Who can create new versions of AMS data objects on a branch of an asset. Different access control may be applied to different branches of an asset; (2) who can read which data objects; and (3) who are authorized to make access control changes In addition, a user when creating a data object in the Vault repository 108 can override the system setting and restrict access to just himself if desired. This is useful for versions that represent work-in-progress and of which users are not ready to show to their colleagues.

Locking

A user obtains the equivalent of a 'write lock' on a branch by reserving the next version in the branch. A user releases the lock by creating the version that is reserved or by aborting the reservation.

Version Pruning

The present invention provides support in the Vault API 106 for two methods for pruning versions as follows. The first method may be executed by a user pointing to a node in the asset tree (typically the root) and requesting that the n latest versions of that node and all versions reachable from them be kept. Objects not reachable from the n latest versions will be pruned.

The second method may be executed by a user pointing directly at a version and requesting that the version and all objects reachable from it be pruned (generally subject to user-specifiable referential integrity constraints).

When prunning, a user can specify that only the contents by removed and that metadata remains. Objects pruned this way will continue to be searchable.

In the extreme, a user can represent that an object (both data and metadata) be completely removed. Objects pruned in this fashion will not be available for subsequent browsing and searching.

In addition, a user may request that a pruned version be deleted from the Vault or merely moved to an archive such as storage tape or the like. Preferably, a daemon routine may be run on a regular basis, such as each night, to keep the version tress well pruned. A system administrator or the like will generally control such routines and parameter for pruning via a simple scripting language or the like.

Replicas

The Vault API 106 provides support for the creation, placement and deletion of copies of an object's contents. Asset contents in the Vault repository 108 are generally dispersed among the various storage devices of computer systems coupled with the present invention via a computer network, as previously discussed.

StudioLib 104

StudioLib 104 contains object oriented C++ classes whose instances are in-memory representations of data objects in the Vault repository 108. It also contains utility library routines and classes, as well as definitions of user interface components that asset management tools 102 can incorporate for a common look and feel.

The most basic asset class in StudioLib 104 is the AmsBase class. AmsBase has methods for checking out the metadata of a data object from the Vault repository 108 into memory. Once in memory, a client uses accessor methods of AmsBase to get individual attributes of a data object. Contents may be checked out into memory or into a file in the local file system. AmsBase also has methods for converting and checking metadata and contents into the Vault repository 108.

The Vault's 106 API is designed so that it requires that any data object that is checked out from the Vault repository 108 must be checked out into memory as an AmsBase (or subtype of AmsBase) object. Similarly, it requires that any data object to be stored in the Vault repository 108 must be presented as an AmsBase (or subtype of AmsBase) object.

Another class provided by the present invention in the StudioLib 104 is referred to as AmsBasePL, which is a subclass of the AmsBase as previously discussed. When a data object is checked out from the Vault repository 108 as an AmsBasePL object, the data object's metadata are manifested as a property list. A property in a property list consists of three elements: (1) a name, which is the name of an attribute, (2) a value, which is the value of the attribute. (This value can be a simple value such as an integer or string, or a set of values. Values can be also structured; elements of those structures can themselves be simple, sets or structures.) (3) a type, which is the type of the attribute's value. (This type must be chosen from a predefined set. This set includes bool, char, date, float, long, string, object-id, blob, struct and vectors of these types.) Thus, an application program could at runtime, query this property list to determine the structure, i.e. attributes and types, and values of the object's metadata. Consequently, It is not necessary for the application to use built-in accessor methods to read the attributes.

Further, the AmsBasePL object's property list is directly modifiable. In this fashion, new attributes could be added and the values of old attributes may be changed. Again, no special asset class need be created to provide accessor methods to perform this function. At checkin, AmsBasePL converts its object's property list into a form that the Vault API 106 requires.

Note that using a property list to modify or create new attributes requires care by the application program making such changes. For instances, it should not introduce a new attribute that is not appropriate to the object's asset type. As previously noted, to handle this problem, an object referred to as the Data Model Manager may be provided by an implementation of the present invention. The Data Model Manager maintains information about what attributes are possible for each asset type, and the legal values of such attributes. The Data Model Manager is an example of a utility class in the StudioLib 104.

Another example of a utility class which may be included in the StudioLib 104 is the LWA (or local work area) class. This class manages the use of the local file systems as a cache for modifying contents in the Vault repository 108.

Other asset classes and utility routines are included in StudioLib 104. The user interface components for example that may be provided in an implementation of the present invention include: an Asset tree browser, an Asset information dialog, a Query constructor, a Query results however, a checkin dialog, a Checkout dialog and a Cataloger.

Figure 7:
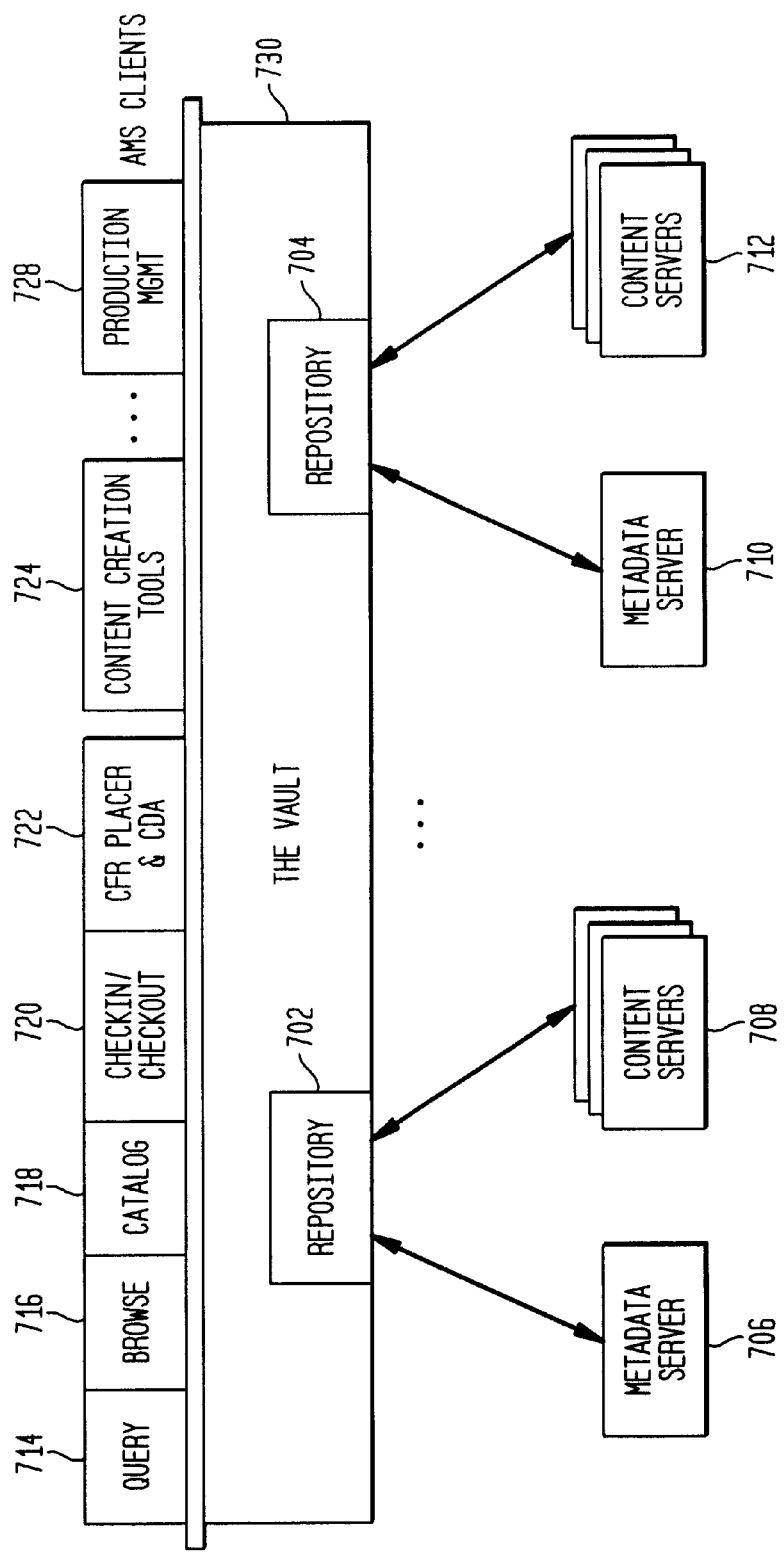
FIG. 7 is a block diagram depicting the structure of an embodiment of the present invention.

Referring now to FIG. 7, the architecture of the present invention is depicted. A number of AMS clients (asset management tools), such as Query 714, Browse 716, Catalog 718, checkin/Checkout 720 and a CFR Placer & CDA (described below) 722 are depicted. In addition, a client that represents a plurality and variety of content creation tools 724 (as previously discussed), are shown. Finally, production management tools 728 are also depicted as one or more AMS client(s). These tools are used for example, for system management functions, as previously described, and for workflow management of the production process. As stated, the AMS clients, preferably communicate with the Vault's 104 API, via the Class Library objects 106 (not shown in this Figure).

Architecture of the present invention

FIG. 7 shows the architecture of the present invention. A number of AMS clients or asset management tools 102 are depicted. Such functions as query 714, browse 716 catalog 718, checkin and checkout 720, CFR placer & CDA 722, content creation tools 724 and production management tools 728 are depicted. Most of these functions have been previously described. The CFR Placer and CDA function client 711, will be discussed below. The Production management tools 728, as previously described, provide functions for system administration and the like, such as configurations for the nearline, online, and offline storage, archiving of data, actual locations of data storage, user access lists, etc. The production management tools also provide functions for workflow management.

The Vault 730 contains one or more repositories 108 as previously described. Each repository 108 may have a different implementation. For example, the metadata server 706 that is used for the repository 108a may be implemented with the commonly available 'Oracle' data base management system, while the metadata server 710 that is used for the repository 108b may be implemented with the commonly available 'Sybase' database management system. The architecture of the present invention does not limit the number of repositories 108 at any one time, nor does it limit the number of different repository implementations.

Typically content servers 708 and 712 are implemented with one or more file servers. The file servers may be distributed among multiple content servers (as depicted by 708 and 712), which may reside in multiple computer systems that are coupled together via a computer network (not shown). The content servers are the storage means for the content portion of AMS data objects and the metadata servers represent the storage and indexing means for the metadata portion of AMS data objects.

The metadata servers 706 and 710 provide services (such as searching, indexing, querying, etc.), that are typically associated with services provided by database management systems. In a preferred embodiment of the present invention, support for off-the-shelf type DBMSs are provided in the Vault API 106. This feature makes it convenient to couple already existing DBMSs with an implementation of the present invention. Support for a variety of commonly available DBMSs are provided by the present invention in the Vault API 106, via communications through their respective publicly available client DBMS libraries.

The metadata servers are used to manage the data objects of the present invention. As previously stated, attributes in the metadata portion of each data object, defines the actual location (within one or more content server(s)) of the content portion of each data object. Thus, all interactions with data objects of the present invention begin with interaction with one or more metadata servers, which lead to the content data portions.

Note, that such interaction with the content and metadata servers is transparent to both the asset management tools 102, and the users of such asset management tools. The present invention provides the necessary underlying support. Additionally, as stated, system administrative functions are provided within the Vault API 106, so that online, nearline, and offline storage, as well as the parameters for the content and metadata servers, are defined.

Movie Play

All multimedia data created and used during the production process are organized by the present invention into data objects that are referred to herein as assets. Each asset comprises two compounds, namely, a contents component and a metadata component. The metadata component comprises information about an asset, while the contents component comprises actual multimedia data, which is typically a digital representation of a visual and/or audio data object.

As previously mentioned, one of the features of the present invention is that is provides support for a device that delivers contents at a constant frame rate (CFR) for accurate playback of video and audio. The CFR Placer & CDA client 722 is an example of an implementation of this function. The architecture for CFR delivery is shown in detail in FIG. 8. The CFR Placer 802 is a program that decides how many copies of a CFR asset to make, and where such copies are to be placed to minimize denial of service. The CFR Placer 802 takes into consideration recent resource usage 804 as well as the configurations of the servers and network 806 when making its decision. Information about how many copies a movie has and where they are located are communicated to other CFR modules through the config and usage databases 804 and 806.

Figure 8:
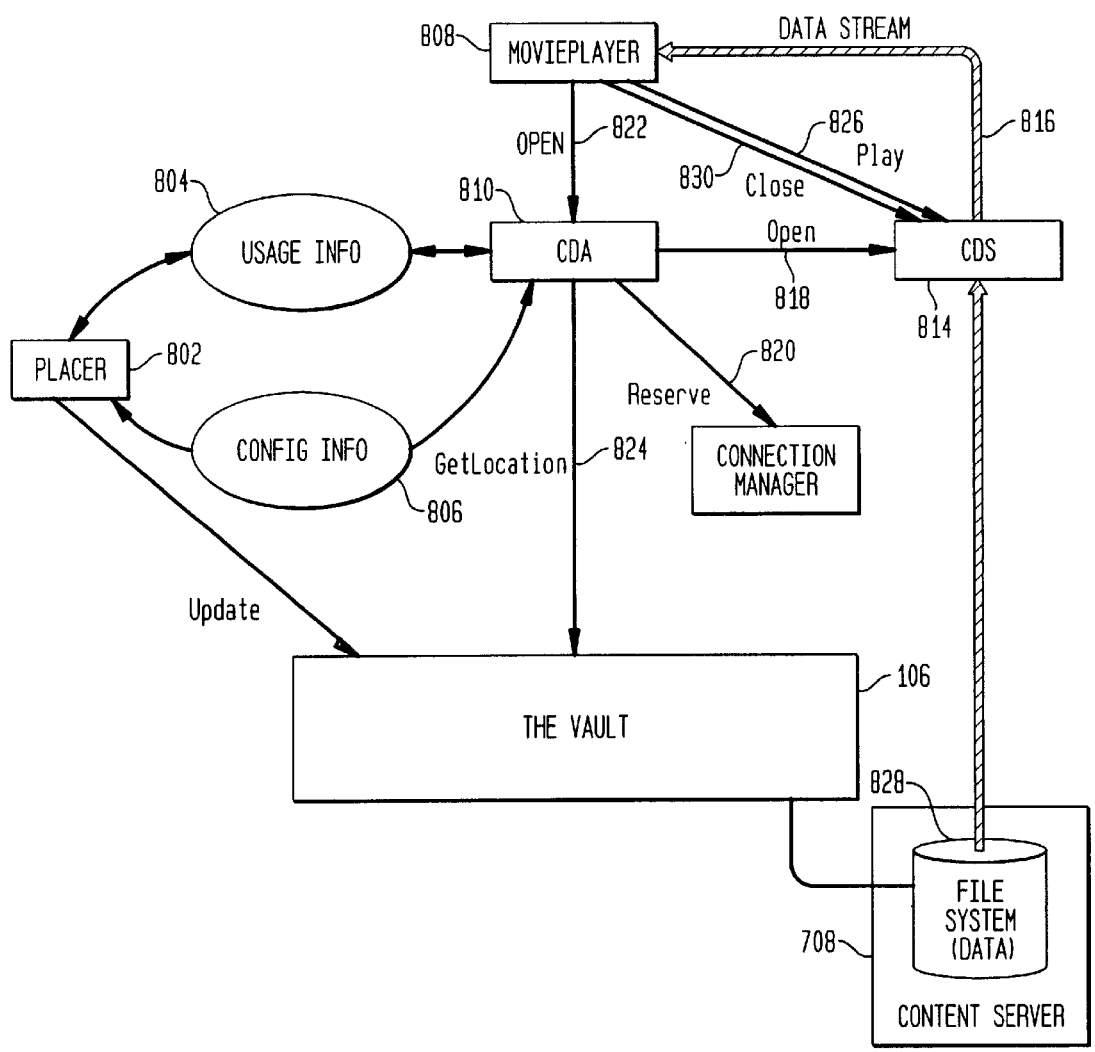
FIG. 8 is a block diagram depicting the constant frame rate support according to an embodiment of the present invention.

The CFR modules depicted in FIG. 8 are best described by going through the steps of playing a movie as follows:

1. The movieplayer 808 makes an open call 822 on CDA 810 (CFR Delivery Service, the CFR module that decides which copy of the movie to use in order to play the movie).
2. The CDA 810 calls the Vault 106 for the locations of all the copies of the movie (call depicted by 'Get Location' arrow 824)
3. If the movie has multiple copies, the CDA 810 consults the usage and configuration databases (804 and 806) on a copy that has adequate disk and bus bandwidth to support the movie play.
4. The CDA 810 calls the Connection Manager 812 to reserve a network connection (see 820) of the desired bandwidth between the chosen copy and the movieplayer 808.
5. If successful, the CDA 810 calls on the CDS (CFR Delivery Service) 814. Note that the CDA 814 is in the same machine as the copy for a movie object (here such location is depicted by file system 828. The CDS 814 is the CFR module that provides a movie's contents to the client machine.
6. The CDS 810 updates the usage database 804 to reflect the disk and network bus bandwidth allotted to the current movie play.
7. The CDA 810 returns CDS's movie object to the movieplayer.
8. The Movieplayer calls play 826 on the movie object.
9. Depending on the protocol the movieplayer 816 adopts, the CDS 814 could either stream the movie to the movieplayer at the pre-arranged frame rate ("push model") or it could let the movieplayer request contents a chunk at a time ("pull model"). Either way, the CDS 814 reads directly from the content server's file system 708.
10. When the movie is complete, the movieplayer 808 calls close 830 on CDS's movie object.
11. The CDS 814 informs CDA 810 of the close.
12. The CDA 810 calls the Connection Manager 812 to release the connection reserved for the movie play.
13. The CDA 810 updates the usage database 804 to reflect end of the movie play.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for managing a multimedia asset, where the multimedia asset comprises multimedia data and a plurality of attributes, wherein each of the plurality of attributes comprises an attribute name, a corresponding attribute type, and a corresponding attribute value, the system comprising:

storage means for storing the multimedia data of the multimedia asset; and a database that stores the plurality of attributes of the multimedia asset, wherein said database comprises an attribute table comprising a record, wherein the plurality of attributes of the multimedia asset are stored within said record;

wherein said record further stores an object-id associated with the multimedia data;

wherein said record comprises an attribute field that stores the plurality of attributes; and wherein the plurality of attributes are stored in said attribute field as a binary large object (blob).

2. A system for managing a multimedia asset, where the multimedia asset comprises multimedia data and a plurality of attributes, wherein each of the plurality of attributes comprises an attribute name, a corresponding attribute type, and a corresponding attribute value, the system comprising:

storage means for storing the multimedia data of the multimedia asset; and a database that stores the plurality of attributes of the multimedia asset, wherein said database comprises an attribute table comprising a record, wherein the plurality of attributes of the multimedia asset are stored within said record;

wherein said database further comprises an attribute type table;

wherein said attribute type table comprises a record that stores said object-id, one of the plurality of attribute names, and the attribute value corresponding to said one of the plurality of attribute names; and wherein said record of said attribute type table comprises an object-id field, an attribute name field, and an attribute value field, wherein said object-id is stored in said object-id field, said one of the plurality of attribute names is stored in said attribute name field, and the attribute value corresponding to said one of the plurality of attribute names is stored in said attribute value field.

3. A method for managing multimedia data, comprising the steps of:

selecting a plurality of attributes corresponding to the multimedia data, wherein each attribute has an attribute name, an attribute value, and an attribute value type;

storing the multimedia data; and storing said plurality of attributes in a database, wherein one of said plurality of attributes contains the location where the multimedia data is stored; wherein said plurality of attributes are stored within a table of said database and further wherein said plurality of attributes are stored within one of a plurality of records of said table and further wherein said one of a plurality of records of said table includes a first field and a second field, and said plurality of attributes are stored within said second field.

4. The method of claim 3, further comprising the step of storing an object-id within said first field.

5. The method of claim 4, further comprising the step of storing said object-id, and one of said attributes' attribute name and attribute value in a record of an attribute type table.

* * * * *